United States Patent [19]

Raser

[11] 4,147,414
[45] Apr. 3, 1979

[54] SUNLIGHT CONCENTRATOR FOR ENERGY CONVERSION

[76] Inventor: William H. Raser, 6451 W. 83rd St., Los Angeles, Calif. 90045

[21] Appl. No.: 899,244

[22] Filed: Apr. 24, 1978

Related U.S. Application Data

[63] Continuation-in-part of Ser. No. 747,561, Dec. 16, 1976, abandoned.

[51] Int. Cl.[2] ............................. G02B 5/12; F24J 3/02
[52] U.S. Cl. ................................... 350/289; 126/270; 353/3; 350/304
[58] Field of Search .................... 126/270, 271; 353/3; 350/289, 304

[56] References Cited

U.S. PATENT DOCUMENTS

| | | | |
|---|---|---|---|
| 1,951,404 | 3/1934 | Goddard | 126/270 |
| 3,009,391 | 11/1961 | Zagieboylo et al. | 353/3 |
| 3,872,854 | 3/1975 | Raser | 126/270 |
| 3,905,352 | 9/1975 | Jahn | 126/270 |

Primary Examiner—Henry C. Yuen

[57] ABSTRACT

A system of mirrors which focuses solar radiation onto a receiver by means of controlled flexural deformations of supporting beams using controls which tilt the mirrors with respect to the beams. This combination of flexure and tilt causes the mirrors to track the sun using an inexpensive system of controls. The use of cables, of parts which can have shorter ranges of operation and of fewer controls than conventional heliostats all contribute to cost reductions.

13 Claims, 5 Drawing Figures

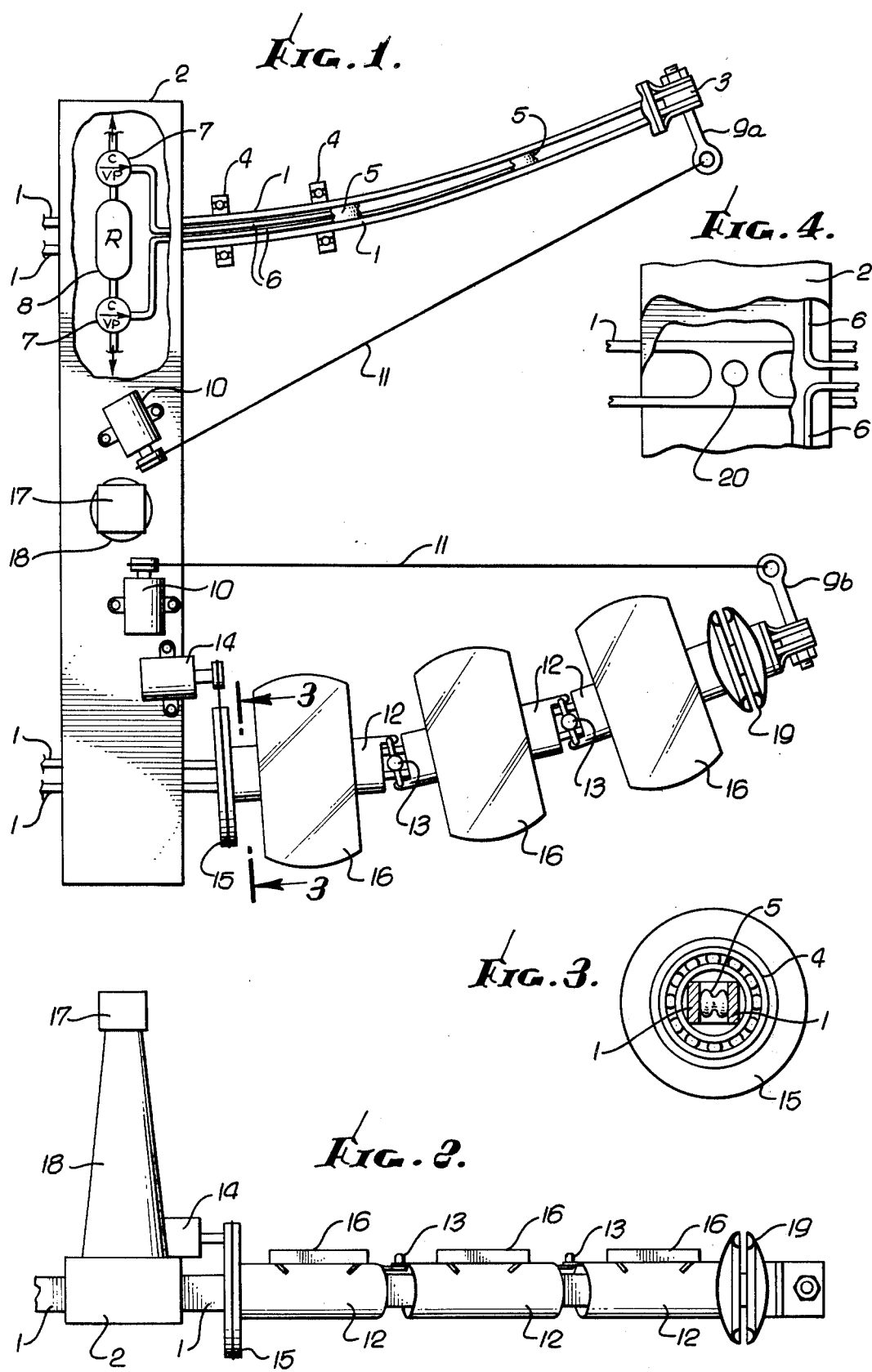

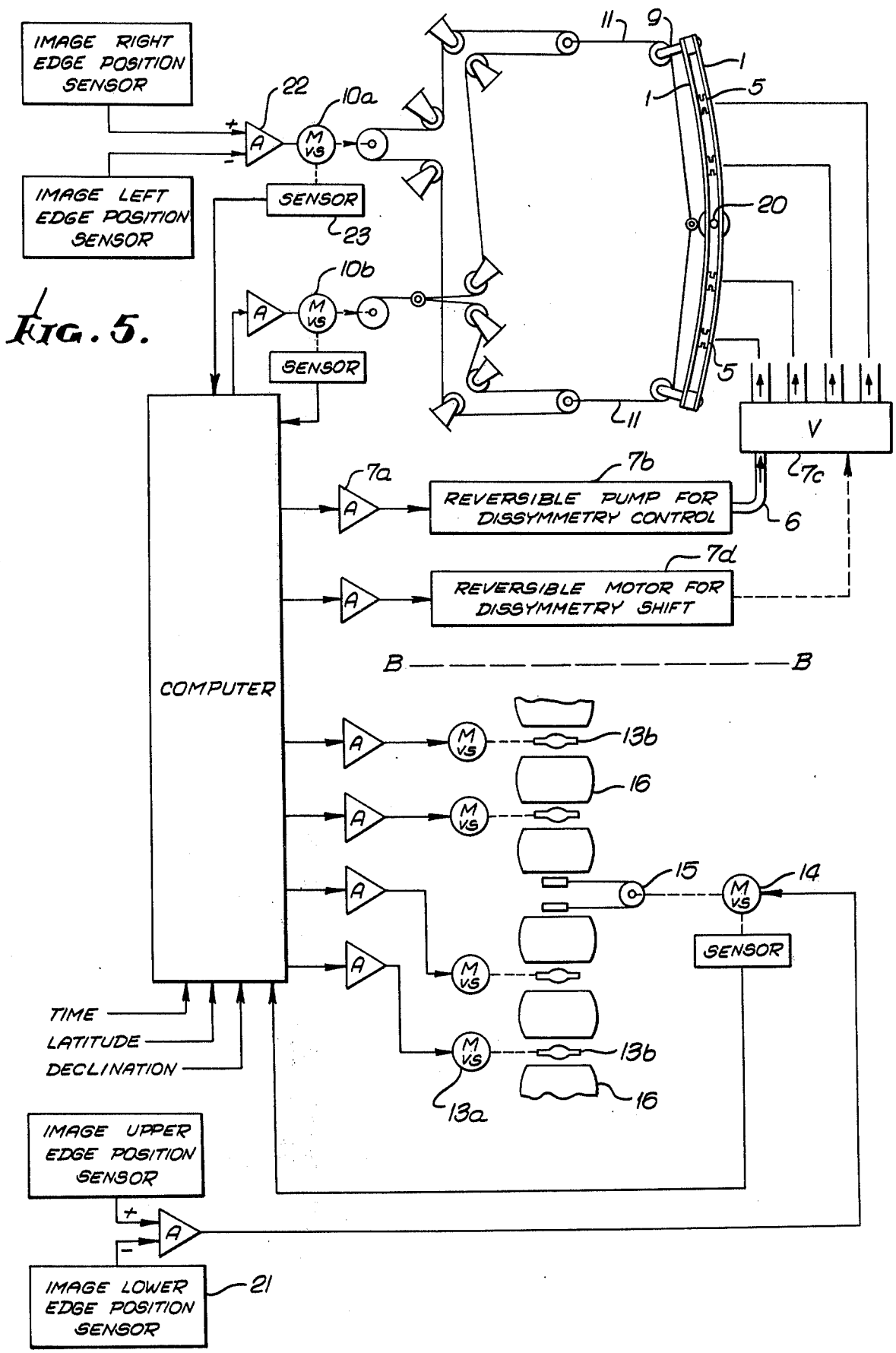

SUNLIGHT CONCENTRATOR FOR ENERGY CONVERSION

This application is a continuation-in-part of my co-pending application Ser. No. 747,561 filed Dec. 16, 1976, now abandoned, carrying the same title as this application.

Reference Cited: U.S. Pat. Nos.
1,951,404; March, 1934; Goddard; 126/270
3,872,854; March, 1975; Raser; 126/270
3,009,391; November, 1961; Zagieboylo et al.; 1353/3
3,905,352; September, 1975; Jahn; 126/270
Also co-pending Application Ser. No. 747,561.

BACKGROUND OF THE INVENTION

1. Field of the Invention

This invention relates to equipment which produces heat from reflected sunlight. One use for this heat is the generation of electric power.

2. Description of the Prior Art

Solar power plants confront the designer with three major challenges, namely, the need to (1) minimize cost in order to be competitive, (2) achieve accuracy in order for high radiation concentration to permit high efficiency in the thermal conversion process, and (3) obtain stability in spite of possible strong winds. This invention is an improvement with respect to all three because it (1) reduces the requirements for precise and expensive parts such as gears, (2) obtains leverage by using tracking drives with greater mechanical advantage, and (3) utilizes the stabilizing effects of base structure breadth and viscous damping.

At present, large mirrors, which are called heliostats when positioned to track the sun, are mounted on pedestals with two directions of position control. These two directions of control correspond to position angles known as azimuth and elevation position angles (like a telescope). The controls and drives which impose these two tracking angles consist of two geared motor systems (servomechanisms). These servomechanisms can be large and expensive if wind imposes appreciable loading. A thousand or more heliostats may be used; the cost of their controls and drives (servomechanisms) has been over ⅓ of all concentrator costs.

FEATURES OF THE INVENTION

My invention reduces the number of azimuth servomechanisms required to a number which is less than the number of heliostats. The arrangement of the heliostats is as if shafts forming elevation angle axes were laid end to end. This array of shaft lengths is implemented by using a flexible or slightly elastic beam. This beam could be initially straight and then deformed in place by means of cables at the tips with reels to introduce tension into the cables. Hydraulic expanders inside the beam cause local stiffness increases in a way which manipulates the distribution of curvature of the beam.

SUMMARY OF THE INVENTION

The primary object of this invention is to provide the high concentration of sunlight required for efficient energy conversion using fewer and less expensive components. This objective is implemented in two ways. First, the array of heliostats is configured to permit the use of both fewer and smaller tracking servomechanisms, e.g., smaller total output range requirements. Second, less expensive components are used, e.g., cables instead of gears, long beams instead of heavy individual pedestals, etc.

A very simple analogy for indicating the potential economy of the invention is the boom of a simple sailboat. Sailors today control the azimuth angle of the boom very well using a cable attached to the tip of this boom. However, if, instead, a strong gearbox were introduced between the mast and the boom so that the sailor introduced the desired angle of the boom by means of a crank without use of cables, the gears in the gearbox would be large and expensive and the sailboat would cost more. One reason why a cable drive is less expensive than a gear drive is its adaptability to attachment out of the point of maximum movement where the mechanical advantage is greatest and the forces involved become the smallest.

Additional objectives include prefabrication capability if not outright mobility, suitability in high winds and adaptability to unprepared ground. The latter refers to grading and other physical preparation only; preparation in the form of surveying and mapping will still be required. This is because the operation of the servomechanisms involves computer usage, i.e., some of the topographical data for the site will be stored and used by a computer.

The use of cables is essential to achieving the primary objectives. Goddard has employed structure with flexural deformation which satisfies optical requirements and which is provided by cables. In other words, Goddard used cables to achieve economical construction of a mirror strip having adjustable horizontal curvature. My U.S. Pat. No. 3,872,854 disclosed mirror structure with torsional deformation implemented using cables. It enabled economical adjustment in the other direction, e.g., in elevation rather than in azimuth control. A further objective of the present invention is to obtain construction which provides economical adjustment (tracking control) in both azimuth and elevation.

BRIEF DESCRIPTION OF THE DRAWINGS

One exemplary but not-specifically-limiting embodiment of the invention is illustrated five figures of the accompanying two sheets of drawing, in which:

FIG. 1 is a plan view of the solar power plant with some parts cut away.

FIG. 2 is an elevation view of this plant.

FIG. 3 is a partial section elevation view along the line 3—3 of FIG. 1. FIG. 3 shows mainly a generally concentric relationship between primary structure and some supported elements.

FIG. 4 is a part of the FIG. 1 view showing some additional details of a slightly different embodiment.

FIG. 5 is a combination of schematic and plan view of details of the more important control elements in both the azimuth drive means (shown above line B—B) and the elevation drive means (shown below line B—B).

DETAILED DESCRIPTION OF THE PREFERRED EMBODIMENTS

The primary structures forming the heliostat mirror mountings are leaf springs. Each such spring consists of two parallel steel bars 1 fixed to a structural base 2 at one end and separated by a thin spacer, 3 at the other. Although not shown, additional spacers may be required for support at stations where bearings 4 are placed around the bars. Elsewhere between the bars are located a plurality of hydraulic pads 5 along the length.

Each hydraulic pad 5 is actually a small high-pressure bellows connected to a pressure line 6. Each of these lines is pressurized by a variable pressure control 7 which is supplied by a hydraulic reservoir 8. Each pad controls the separation distance between the bars at the station where it is located and enough pads are used to match accurately any desired distribution of separation distance along the length. Since the flexural section moment of inertia is proportional to the square of the distance separating the centroids of the two bars and since the curvature per unit of moment applied is inversely proportional to this section property, the distribution of slope is controlled by these hydraulic components 5, 6, 7, and 8. This type of control requires sensing and computing means.

The leaf spring in the upper part of FIG. 1 has an eye 9a at its free end. This particular leaf spring is shown with curvature in the direction which corresponds to the case of no applied moment. A positioning motor 10 and a cable 11 are attached to eye 9a and apply tension and resulting bending moments.

The lower part of FIG. 1 shows another leaf spring which is complete and which carries eye 9b at its tip. Due to tension in a cable 11 to this eye, this particular leaf spring is forced to curve inward. With the proper separation distance between the pair of bars 1, 1 as determined by controlled pad pressure, the shape of the curve is that of part of a conic section (usually an ellipse).

By means of bearings 4, 4, three sleeves 12, 12 are mounted on each leaf spring between the base and the tip. At each place where there sleeves meet, a connecting link 13 having its length controlled by a small motor spans the distance between connecting points on each of the two confronting sleeves to introduce differential sleeve rotations. These variable-length links, together with protruding fingers or whatever serves as connecting points for these links, constitute differential gear mechanisms or the equivalent. The differential sleeve rotations are just like differential elevation angles for whatever is mounted on the sleeves. In airplanes, variable length links employing motor driven turnbuckles are used to rotate trim tabs and ailerons.

The rotation angle of each innermost sleeve is determined by a positioning motor 14 and its driven sprocket 15. Therefore if the two interfacing link mechanisms 13, 13 introduce differential (incremental) sleeve rotations, the tilting of the outermost sleeve about the longitudinal axis of the leaf spring will be an innermost sleeve angle plus two incremental sleeve rotations.

A mirror 16 is fixed to each sleeve. With this arrangement, the mirrors are able to concentrate sunlight on a central receiver 17 on top of a tower 18 which rests on the base 2. To do this, each mirror must be tilted to the correct elevation (sleeve rotation) angle, the length of the leaf spring immediately supporting each sleeve 12 must have the correct azimuth angle, and there must be no significant vibrations due to the wind. A viscous damper 19 is inserted between the outermost sleeve and the tip of the leaf spring to suppress torsional vibrations. Such a device is the angular equivalent of a dashpot or shock absorber. Likewise, viscous circuitry of a similar nature can be introduced into the pad lines 6, 6 to suppress horizontal plane vibrations. The spring bars 1, 1 are very stiff in the vertical direction.

FIG. 1 shows two leaf springs cantilevered from the base 2 toward the right hand side. It also shows parts of four bars 1 which are intended to represent two additional similar leaf springs cantilevered toward the left hand side. Therefore, two points exist where a leaf spring extends outward in both directions. Such points are center points for pairs of cantilevered beams; such pairs resemble the beams of crossbow weapons and are called crossbow beams.

As shown in FIG. 4, a second embodiment of the invention differs from the first primarily in that the two center points are hinge points instead of fixed crossbeam attachments. Each hinge consists of a vertical pin 20 serving as a vertical axis about which a pair of leaf springs can rotate. This pair of leaf springs consists of four bars 1, 1. However, since this second method of fabrication involves use of bars having this full (double) length of the crossbow beams, each of what would be called a pair of springs in the first embodiment is now a single leaf spring having two leaves. The length of each of these leaves corresponds to twice that of a bar 1 in the first embodiment. A pair of these leaves is now called a hinged beam. As a consequence of the hinges at the beam midpoints, these beams can now be flexed to perfect optical alignment of all mirrors 16, 16. Perfect optical alignment means that, for any position of the sun, a sunbeam coming to the center of every mirror 16 will be reflected toward the center of the receiver 17. In other words, the azimuth and elevation angles of each mirror must be unique functions of sun position.

Consider the case where the sun is directly overhead. In this case, the beam tips are pulled inward strongly and the pads are programmed to cause uniform curvature. In other words, each leaf spring beam forms an arc of a circle of some radius R. The differential sleeve angles are set to zero and the most inboard sleeves are set at half the angle whose tangent is R/h where h is the tower height. Another simple example is where the sun and the receiver are both very low; in this case, the leaf spring beams must be shaped into parabolas. For intermediate positions of the sun, perfect optical alignment will require each hinged beam to conform to the shape of part of an ellipse.

The reason for this can be demonstrated using the laws of physics. At each point where optical reflection occurs, the angle of incidence equals the angel of reflection. Because of this equality, any surface capable of reflecting all parallel radiation (such as direct sunlight, approximately) onto a target point T must be a paraboloid of revolution having its axis both intersecting T and being parallel to the sunlight. Therefore, every mirror must have the azimuth and elevation angles at its center point, P equal to the azimuth and elevation angles of a plane tangent at P to a paraboloid satisfying the following three conditions: (1) it intersects P, (2) it has an axis TS where S is the center of the sun, and (3) it has a focal length extending from its vertex to T. It is possible to calculate all the azimuth and elevation angles along the beam from these conditions and from the fact that the beam centerline is a continuous curve.

This beam centerline lies in a horizontal plane. For perfect optical alignment, the shape of this beam centerline must be such that every mirror azimuth angle must coincide with that of the tangent to the beam centerline at the mirror centerpoint. Therefore, the conditions for perfect optical alignment are satisfied provided the beam centerline fits the desired curve, provided each bearing 4 is mounted concentric to the beam centerline and provided there is very small separation distance between each two bearings 4, 4 on which is mounted each sleeve 12.

As long as each beam remains in one plane, the shape of its desired centerline curve is always known. From analytic geometry, it is known that the intersection of a paraboloid and a plane is a conic. In general, this conic takes the form of an ellipse. Enough hydraulic pads 5, 5 are employed to caause the shape of each beam to be a close approximation to a part of whatever desired ellipse corresponds to a give sun position. As the direction of the sun changes, the parameters defining each ellipse change. At the same time, the servomechanisms 13, 14 which control elevation angles (sleeve rotations) are equally busy. In this way, perfect optical alignment is theoretically possible and is actually closely approximated.

Other embodiments are obvious. Higher concentrations can be achieved by having more than three mirrors on each side of a beam, by having more than two beams, and, sometimes, by having the receiver at other than the center location of the base. For simplicity, the unloaded centerlines of all beams can be straight lines and the sensing devices for angle position control can be a combination of optical (photovoltaic) and mechanical (wire reeling) means.

A minimum of four such photovoltaic optical sensing means are required. One of the four is a combined reflected image lower edge position sensor 21. The other three sense the upper, left and right edges of the combination of images. Each of these four sensors supplies half of a differential signal to an amplifier 22 which drives a servomechanism-type motor 10, 14. These servomechanism-type motors perform not only as drives for the heavily loaded part of the control system but also as reference sources for the rest of the control system. That is, all other (non-servomechanism type) motors 5, 13 are controlled by signals which are generated as computer output; to help obtain and to check this output, the position of each servomechanism-type motor is monitored by a sensor 23 which feeds position data to the computer.

In certain types of control systems, the sequence of feedbacks is important. Azimuth control can be characterized by assigning primary status to control of the beam tip positions 9, 9 (by means of cables 11, 11) and secondary status to the beam curvature (by means of pads 5, 5). Elevation control proceeds in the opposite direction, i.e., from base 2 to tip 9; this is because the motor 14 has absolute control of the innermost sleeve 12 whereas increased proximity to the tip introduced progressively more dependence upon other sleeve positions. Therefore, for these and other reasons, if the true continuous nature of the controls is ignored, the control operations can be approximated by an analogous sequence of four steps as follows: first, the tips of the beams are like platforms which are rotated to the desired azimuth angles; second, the inboard sections are similarly positioned; third, the inboard sleeves are tilted so their mirrors have the correct elevation angles; finally, the outermost mirror elevations are set. Therefore, an outer and inner section of a beam can be called a first and second platform, respectively, and an inner and outer sleeve can be called a first and second mirror, respectively.

While particular embodiments of my invention have been shown and described, it will be obvious to those skilled in the art that changes and modifications may be made without departing from my invention in its broader aspects, and, therefore, it is the aim of the claims to cover all such changes and modifications.

I claim:

1. A heliostat orienting system, including:
    base means;
    azimuth orienting means including a first horizontal arm supported by said base at a first point on said arm, for movement of points on said arm, remote from said first point, only in a horizontal plane;
    elevation orienting means including a first sleeve encircling said first horizontal arm and rotatably supported therefrom for rotation thereabout;
    a source of control signals;
    azimutal drive means supported by said base means, coupled to said first horizontal arm and responsive to signals from said source for positioning each point along said first horizontal arm at a desired azimuthal position; and
    elevational drive means supported from said base means coupled to said first sleeve and responsive to signals from said sources for positioning any point on said first sleeve at a desired elevational angle.

2. A system according to claim 1 including, in addition, a light reflector affixed to said first sleeve and rotatable therewith.

3. A system according to claim 1 in which said first horizontal arm is flexible in the horizontal plane only and said azimuthal drive means causes flexure thereof.

4. A system according to claim 3 in which said first arm comprises a leaf spring.

5. A system according to claim 1 which includes, in addition, a plurality of sleeves encircling said first horizontal arm and means for intercoupling, in angularly adjustable fashion, said plurality and said first sleeve.

6. A system according to claim 5 in which each of said plurality of sleeves and said first sleeve has a solar energy reflector affixed thereto for rotation therewith.

7. A system according to claim 1 in which said first horizontal arm is a leaf spring, said leaf spring comprises juxtaposed first and second beams, and incremental arm-flexing means are interposed between said first and second beams along their lengths.

8. A system according to claim 7 which includes, in addition, hydraulic actuating means coupled to said incremental arm-flexing means.

9. A system according to claim 1 in which cable means are connected to the outer extremity of said first horizontal arm for flexing of said arm.

10. A system according to claim 9 which includes, in addition, means for tensioning said cable.

11. A field of helisotats comprising:
    a first platform which establishes a first horizontal axis,
    a second platform which establishes a second horizontal axis,
    a means for moving the said first platform so that its first horizontal axis has a desired azimuth angle,
    a means for moving the said second platform relative to said first platform so that the difference between their two horizontal axes is a desired azimuth increment, this azimuth increment resulting from the curvature of a flexed beam,
    a first mirror mounted on said second platform for rotation about its horizontal axis,
    a second mirror mounted on said first platform for rotation about its horizontal axis,
    a means for rotating the said first mirror about its horizontal axis so that its elevation angle has a desired value, a means for rotating the said second mirror about its horizontal axis so that the difference between the elevation angle of the second mirror and the elevation angle of the first mirror has a desired value, this difference being observable as a twisting increment about a flexed beam, and control means for four said means so that said mirrors will continuously focus sunlight onto a fixed receiver.

12. The sunlight concentrator of claim 11 in which said first platform is the tip of a leaf spring and said second platform is an intermediate station along the length of this leaf spring.

13. The sunlight concentrator of claim 11 in which the means for moving the said first platform is a cable connected to a motor, said first platform being stabilized by a viscous damping means.